(12) United States Patent
Priyadarshi et al.

(10) Patent No.: US 7,870,123 B2
(45) Date of Patent: Jan. 11, 2011

(54) DATABASE OPTIMIZER PLAN VALIDATION AND CHARACTERIZATIONS

(75) Inventors: Bibhu Ranjan Priyadarshi, El Segundo, CA (US); Grace Au, Rancho Palos Verdes, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 553 days.

(21) Appl. No.: 11/565,797

(22) Filed: Dec. 1, 2006

(65) Prior Publication Data
US 2008/0133457 A1 Jun. 5, 2008

(51) Int. Cl.
*G06F 7/00* (2006.01)
(52) U.S. Cl. .................... 707/718; 707/713; 707/714
(58) Field of Classification Search .............. 707/1, 707/2, 3, 5, 713, 714, 718
See application file for complete search history.

(56) References Cited

U.S. PATENT DOCUMENTS

| 7,370,043 | B1* | 5/2008 | Shelton et al. | 707/4 |
| 7,383,246 | B2* | 6/2008 | Lohman et al. | 707/2 |
| 2006/0004695 | A1* | 1/2006 | Day et al. | 707/2 |
| 2006/0106839 | A1* | 5/2006 | Shen et al. | 707/101 |
| 2008/0114718 | A1* | 5/2008 | Anderson et al. | 707/2 |

* cited by examiner

*Primary Examiner*—Hung Q Pham

(57) ABSTRACT

The invention relates to a method of determining the performance of an optimizer program arranged to generate a plan. The method generally comprises the steps of executing the optimizer utilising at least one test case to derive a pre-variation plan; executing the pre-variation plan to generate a first output; varying a strategy of the optimizer program; executing the varied optimizer program utilising the at least one test case to derive a post-variation plan; and executing the post-variation plan to generate a second output. The outputs are then grouped according to at least one element of the plans to assess the performance of the optimizer.

26 Claims, 7 Drawing Sheets

| t1leftgeog | t1rightgeog | t2leftgeog | t2rghtgeog | t1jn | t2jin | testname | Query count | Total Regression |
|---|---|---|---|---|---|---|---|---|
| duped/sorted | local/sorted | local/sorted | duped/sorted | MJ | MJ | BINARYJOI NAXPRPV | 1 | 0.99 |
| hashed/sorted | hashed/sorted | hashed | hashed | MJ | HJ | BINARYJOI NAXPRPV | 1 | 85.35 |
| hashed/sorted | hashed/sorted | hashed | hashed | MJ | PJ | BINARYJOI NAXPRPV | 1 | 0.96 |
| hashed/sorted | hashed/sorted | hashed | hashed | MJ | PJ | BINARYJOI NAXPRPV | 2 | -0.59 |
| local/sorted | duped/sorted | hashed | hashed | MJ | HJ | BINARYJOI NAXPRPV | 4 | 54.05 |
| local/sorted | duped/sorted | hashed | hashed | MJ | PJ | BINARYJOI NAXPRPV | 1 | 35.81 |
| duped | local | duped/sorted | local/sorted | HJ | MJ | BINARYJOI NRPVRPV | 1 | 120.21 |
| hashed | hashed | duped | local | HJ | HJ | BINARYJOI NRPVRPV | 2 | -62.96 |
| hashed/sorted | hashed/sorted | duped | local | MJ | HJ | BINARYJOI NRPVRPV | 6 | -78.47 |
| hashed/sorted | hashed/sorted | hashed | hashed | MJ | HJ | BINARYJOI NRPVRPV | 5 | -7.08 |
| hashed/sorted | hashed/sorted | hashed | hashed | MJ | PJ | BINARYJOI NRPVRPV | 1 | -1.55 |

*Fig. 5 (Summary Table)*

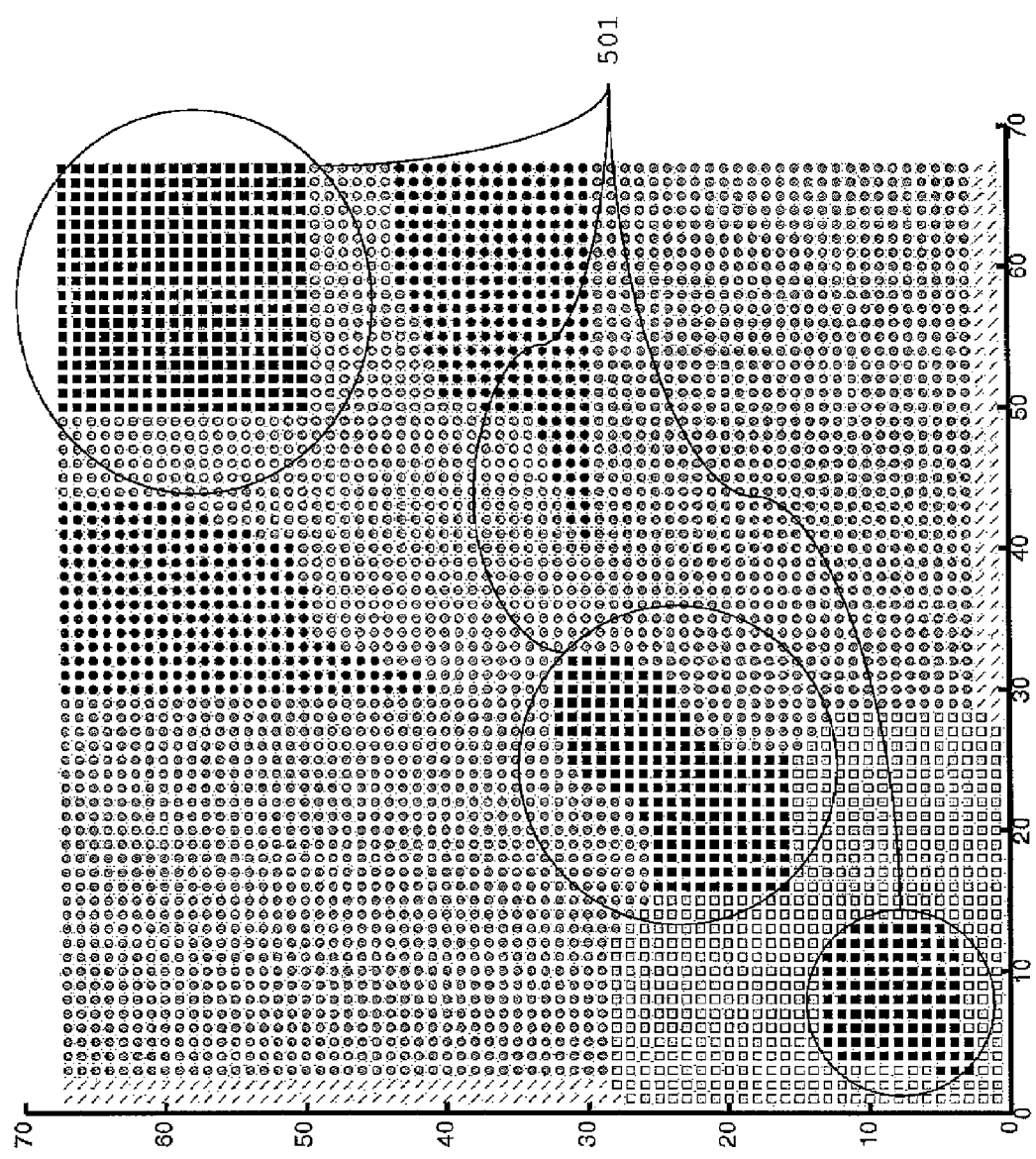
Fig. 6 (before variation)

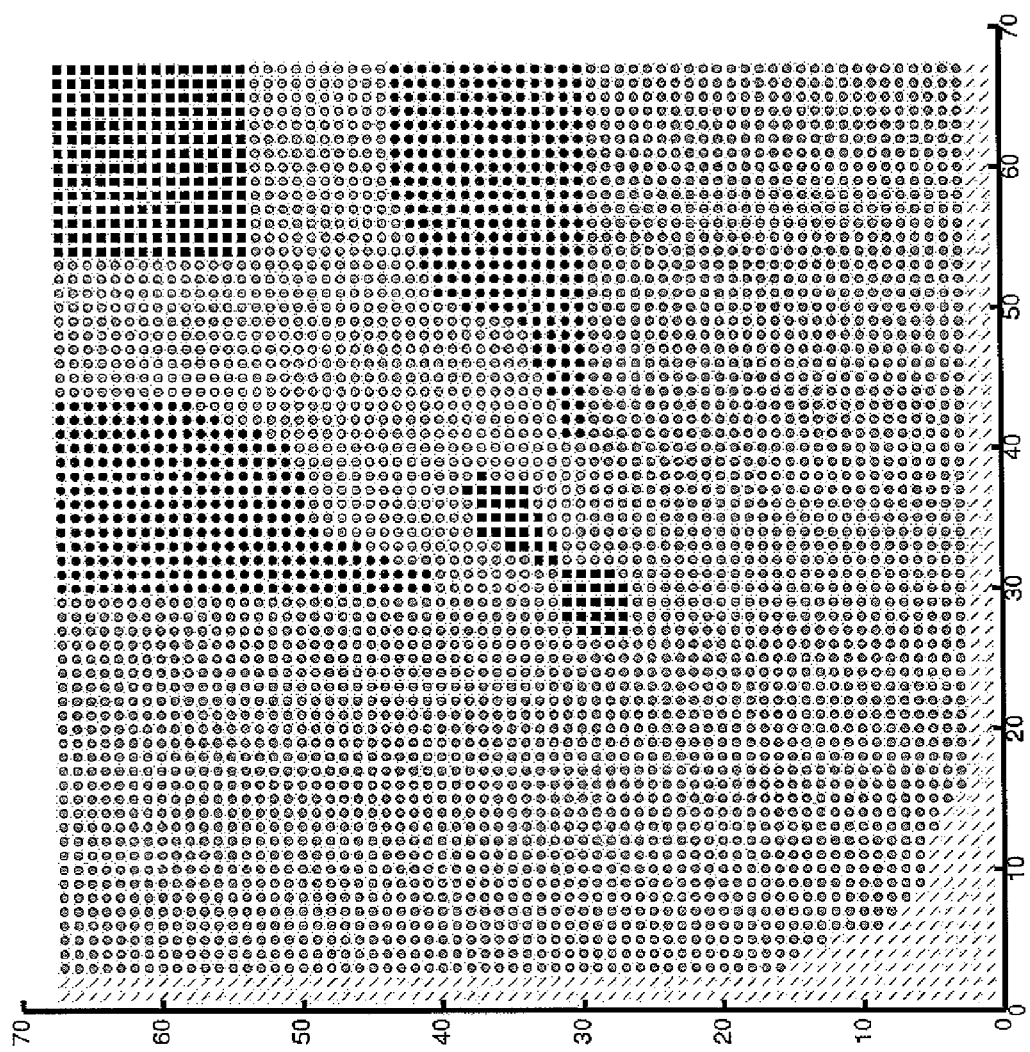
Fig. 7 (after variation)

DATABASE OPTIMIZER PLAN VALIDATION AND CHARACTERIZATIONS

FIELD

The present invention relates generally to the field of optimization techniques for databases, and more particularly, but not exclusively, to optimization techniques for relational databases using a Structured Query Language (SQL).

BACKGROUND

Relational database systems store data in tables organised by columns and rows. The tables typically are linked together by "relationships" that simplify the storage of the data and make complex queries against the database more efficient. SQL is a standardised language for creating and operating on relational databases. An example of a SQL program is Teradata, a product of NCR Corporation.

In the normal course of running a database, the data in the tables will be queried to retrieve values held in the database. Database queries are also known as read operations (i.e. these operations do not alter the database, they merely retrieve information from the database).

In the present business environment, faster execution of SQL can lead to significant time savings in accessing and processing data stored in the relational databases. To achieve faster execution, each of the SQL query plans are evaluated and query plans with the lowest time cost are chosen. Software programs known as "Optimizers" have been developed to automate this process. Optimizers are typically embedded in the SQL compilers and operate to choose the most cost effective query plans during compilation. An example of an Optimizer program tailored for evaluating SQL query plans based on cost is the "Teradata Optimizer", also owned by NCR Corporation.

Optimizer programs typically optimize based on either cost (which is typically measured in terms of time), or based on resource consumption. As such, it is imperative that optimization strategies employed by the Optimizer are the most effective for the SQL code to retrieve data from tables either in the shortest period of time possible or using the least amount of resources. After every software release or fix, however, the join strategies and costing algorithms can change considerably. In some applications, these changes may lead to severe degradation in performance.

SUMMARY

In accordance with a first aspect of the present invention there is provided a method of determining the performance of an optimizer program arranged to generate a plan, the method comprising the steps of executing the optimizer utilising at least one test case to derive a pre-variation plan; executing the pre-variation plan to generate a first output; varying a strategy of the optimizer program; executing the varied optimizer program utilising the at least one test case to derive a post-variation plan; executing the post-variation plan to generate a second output; and grouping the outputs according to at least one element of the plans to assess the performance of the optimizer.

Preferably, the elements comprise demographic or characteristic information. In an embodiment, the at least one test case comprises one or more queries for testing the strategy of the optimizer program. The outputs may be expressed as a function of execution time, or time taken by the CPU to execute the plan. Preferably, the method comprises the further step of executing only pre and post variation plans which have different join strategies or geographies. In an embodiment, the step of varying the strategy of the optimizer comprises changing at least one costing algorithm strategy utilized by the optimizer program. In an alternative embodiment, the step of varying the strategy of the optimizer comprises making a cardinality estimate change to the optimizer program.

In an embodiment, the method comprises the further step of plotting a plurality of individual joins generated by one of the plans as points on a graph, the visual appearance of each point providing a representation of at least one of a join strategy and geography used to perform the join. In an embodiment, the method comprises the further step of comparing the results of pre and post variation plans by plotting as points on a graph only joins that have at least one of a different geography and join strategy when the pre and post variation plans are compared. Preferably, the method comprises the further step of utilising at least one of a symbol and color to represent the points on the graph, the at least one of a symbol and color representing a quantative measure of the performance of the join. Advantageously, by plotting the joins in such a manner a clear understanding can be gained of what, where and how much change has occurred in the join strategies for the particular test, as a result of the variation.

In accordance with a second aspect of the present invention there is provided a system for determining the performance of an optimizer program arranged to generate a plan, the system comprising: an optimizer arranged to utilize at least one test case to derive a pre-variation plan; a module being arranged to vary a strategy of the optimizer; the varied optimizer arranged to utilize the at least one test case to derive a post-variation plan; a database arranged to execute the pre-variation plan to generate a first output and the post-variation plan to generate a second output; and a module arranged to group the outputs according to at least one element of the plans and to generate a report displaying the at least one element in association with the outputs, to assess the performance of the optimizer.

In a third aspect, the present invention provides a computer program including at least one instruction which when loaded on a computing system is arranged to implement the method of a first aspect of the invention.

In a fourth aspect, the present invention provides a computer readable medium providing a computer program in accordance with the third aspect of the present invention.

BRIEF DESCRIPTION OF THE DRAWINGS

FIG. 5 is a summary table showing outputs grouped according to geography and join type.
FIG. 6 is a pre-variation graph outputted by the optimizer validation tool for a particular test plan.
FIG. 7 is a post-variation graph outputted by the optimizer validation tool for a particular test plan.

DETAILED DESCRIPTION OF PREFERRED EMBODIMENTS

Figure 1:
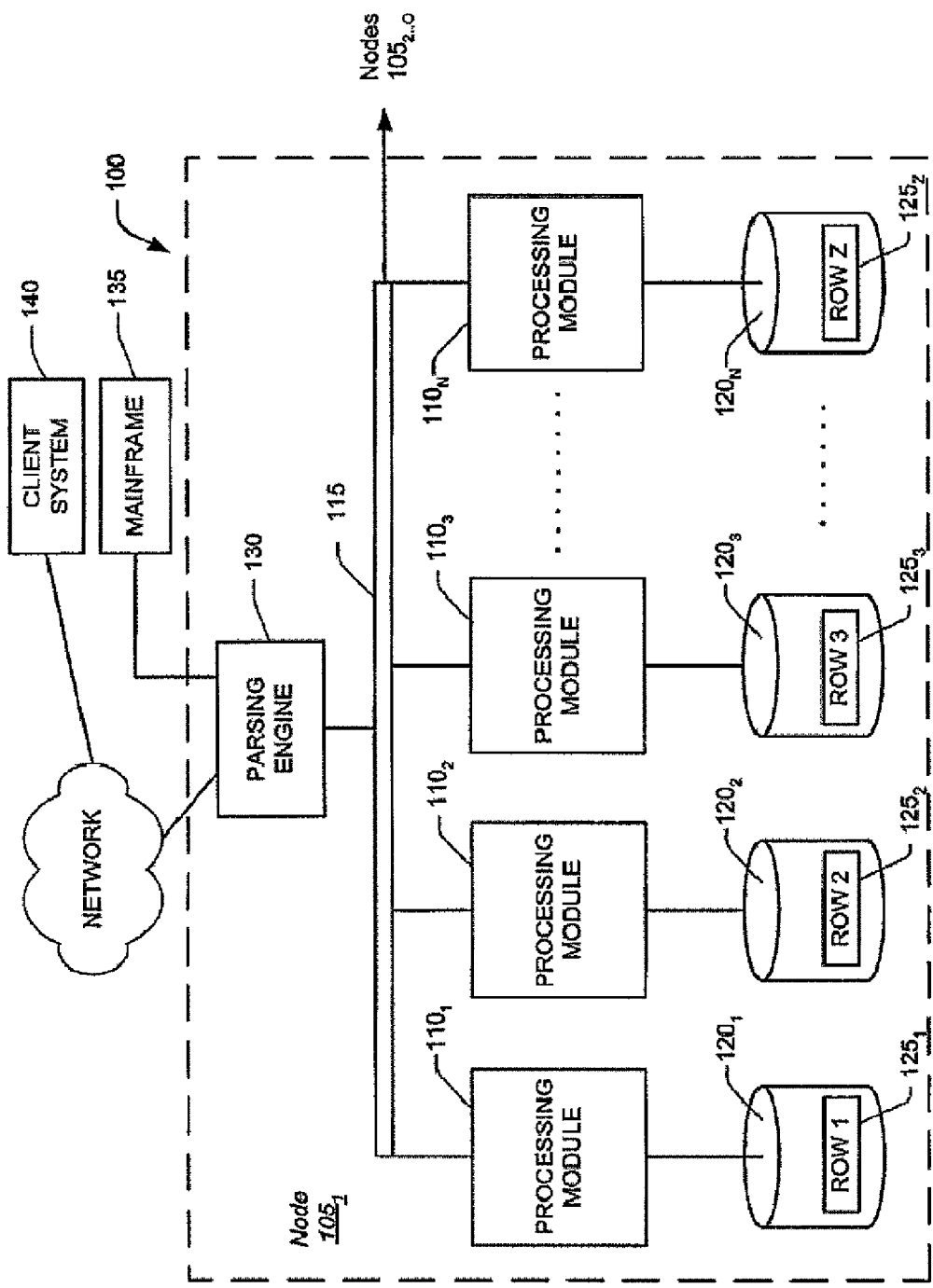
FIG. 1 is a block diagram of a node of a database system.

The optimizer validation tool for determining the performance of an optimizer as a result of a change, or variation to strategies employed by the optimizer as disclosed herein, has particular application, but is not limited, to large databases that might contain many millions or billions of records managed by a database system ("DBMS") 100, such as a Teradata Active Data Warehousing System available from NCR Corporation. FIG. 1 shows a sample architecture for one node 1051 of the DBMS 100. The DBMS node 1051 includes one or more processing modules 1101 . . . N, connected by a network 115, that manage the storage and retrieval of data in data-storage facilities 1201 . . . N. Each of the processing modules 1101 . . . N may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules 1101 . . . N manages a portion of a database that is stored in a corresponding one of the data-storage facilities 1201 . . . N. Each of the data-storage facilities 1201 . . . N includes one or more disk drives. The DBMS may include multiple nodes 1052 . . . O in addition to the illustrated node 1051, connected by extending the network 115.

The system stores data in one or more tables in the data-storage facilities 1201 . . . N. The rows 1251 . . . Z of the tables are stored across multiple data-storage facilities 1201 . . . N to ensure that the system workload is distributed evenly across the processing modules 1101 . . . N. A parsing engine 130 organizes the storage of data and the distribution of table rows 1251 . . . Z among the processing modules 1101 . . . N. The parsing engine 130 also coordinates the retrieval of data from the data-storage facilities 1201 . . . N in response to queries received from a user at a mainframe 135 or a client computer 140. The DBMS 100 usually receives queries and commands to build tables in a standard format, such as SQL.

In one implementation, the rows 1251 . . . Z are distributed across the data-storage facilities 1201 . . . N by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities 1201 . . . N and associated processing modules 1101 . . . N by a hash bucket map. The characteristics of the columns chosen for the primary index determine how evenly the rows are distributed.

Figure 2:
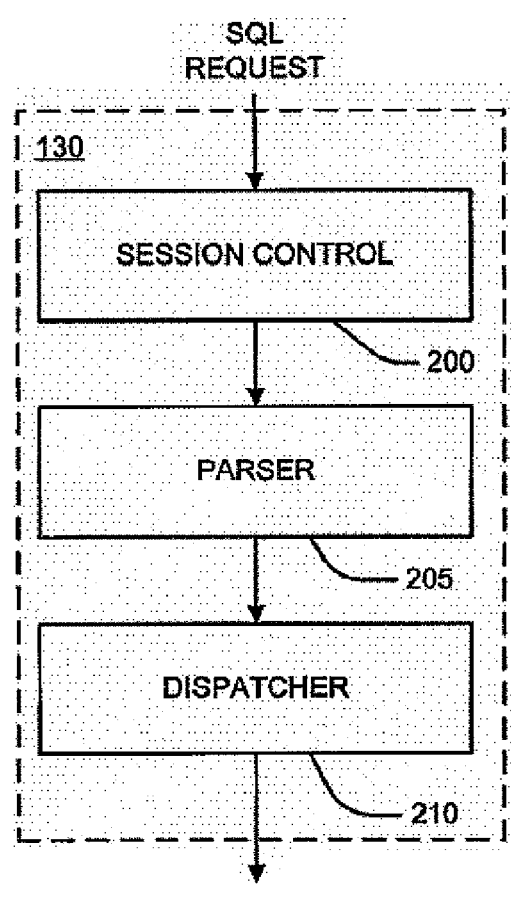
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
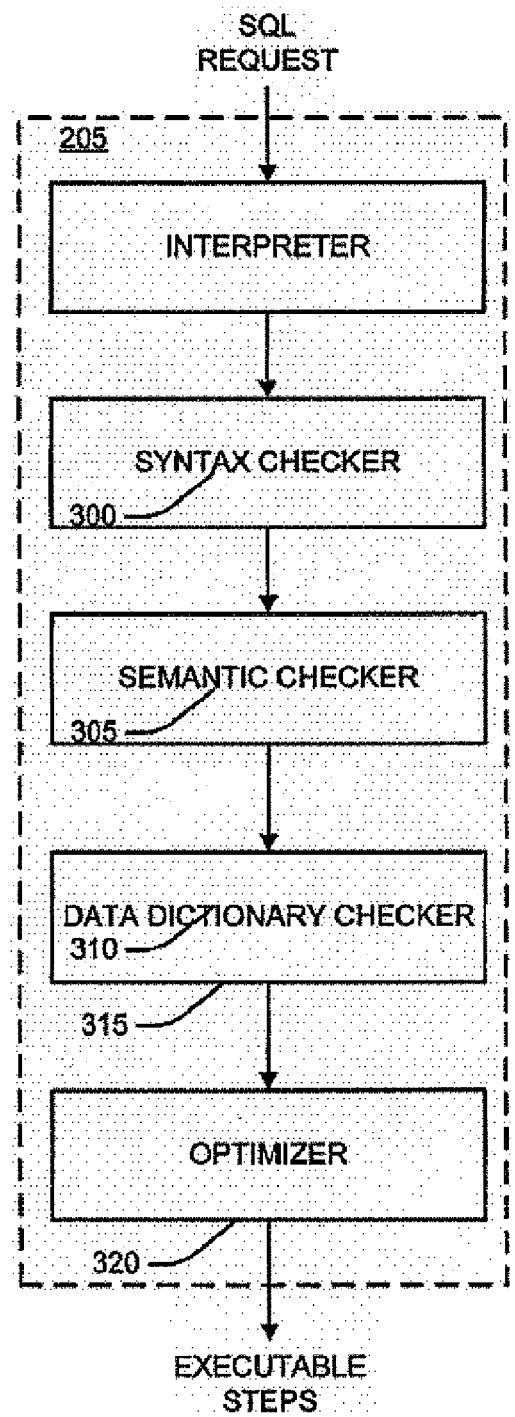
FIG. 3 is a block diagram of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which generates the least expensive plan to perform the request.

As a result of query optimization, an execution or access plan is generated (often using data such as platform capabilities, query content information, etc.), that is stored in the database. Once generated, the execution plan is forwarded to parsing engine 130 for execution of the database query on the information in the database. The result of the execution is typically stored in a result set. While the parser engine 130 executes the plan, a database monitor tracks performance of the execution and collects statistics and other information about how the plan is performing. The statistics and information for each query are stored in a monitor database which is typically in the form of a relational database that permits easy searching and retrieval of data.

Figure 4:
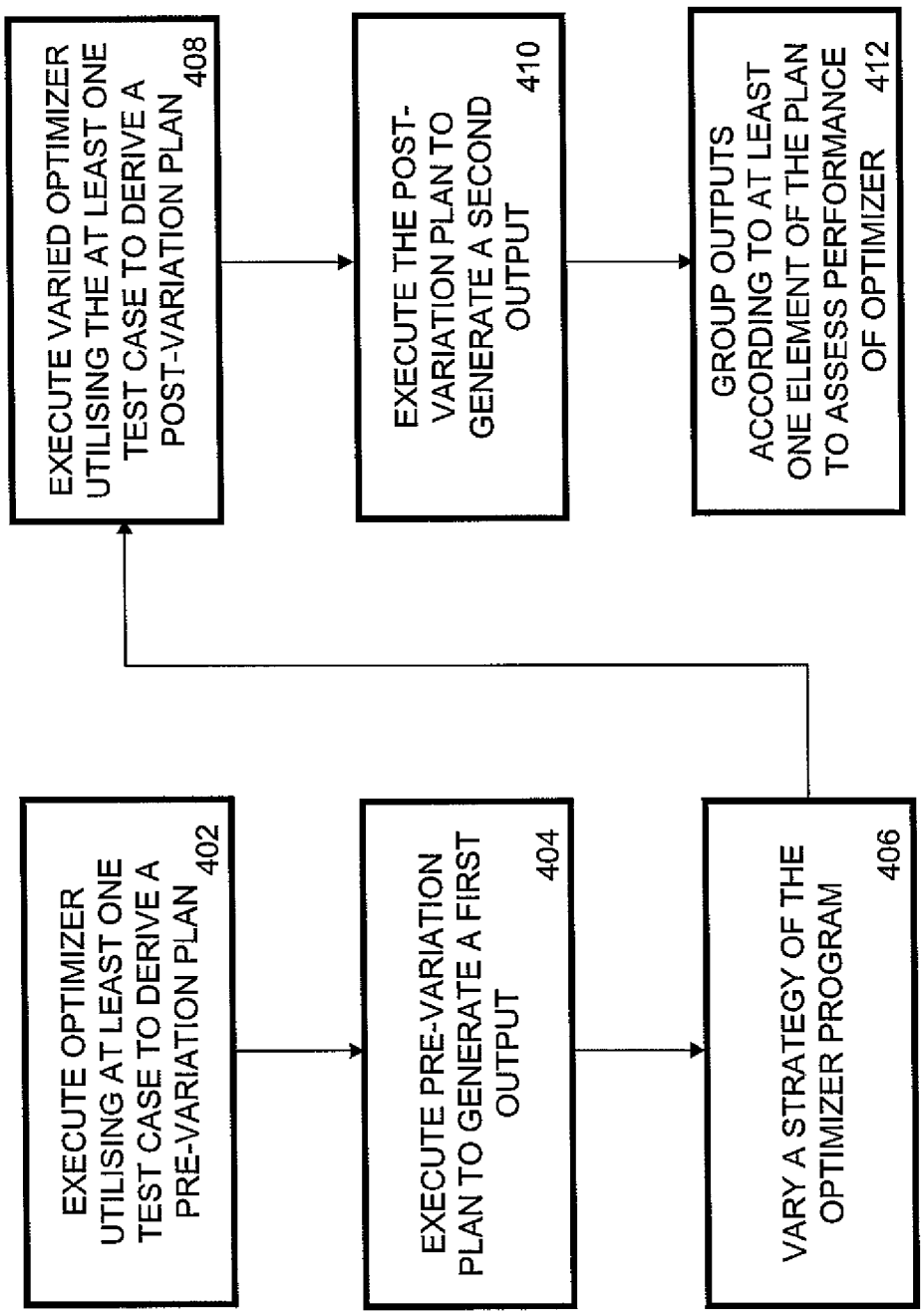
FIG. 4 is a flow chart illustrating method steps performed by an optimizer validation tool.

With reference to FIG. 4, there is shown a flow chart outlining method steps for a method which assists a user or administrator to determine an impact of a change to a strategy of an optimizer program. The change may comprise, for example, of a change to a costing algorithm or join strategy of the optimizer program as a result of a software release, or fix. In an alternative embodiment, the method can be used to determine a performance impact as a result of a cardinality estimation change, for example, a join cardinality, selection cardinality or skew cardinality change.

In general terms, the method comprises the steps of executing the optimizer utilising at least one test case to derive a pre-variation plan; executing the pre-variation plan to generate a first output; varying a strategy of the optimizer program; executing the varied optimizer utilising the at least one test case to derive a post-variation plan; executing the post-variation plan to generate a second output; and grouping the outputs according to at least one element of the plans to assess the performance of the optimizer. In this manner every change of the optimizer output may be grouped and its performance measured in aggregation. This information can be used to formulate a number of facts about the optimizer or execution engine for the particular query used to produce the plan.

A more detailed description of an embodiment of the present invention will now be described with reference to FIGS. 5 to 8. As mentioned above, the first step in implementing the method comprises inputting test cases into the optimizer program before and after the variation to the strategy for generating pre and post variation plans. In accordance with the embodiment described herein, the test cases are SQL test cases comprising one or more SQL queries for testing a particular strategy of the optimizer program. For example, it may be desirable to determine the impact of new single-table access cost formulas on binary join plans used in a new optimizer program release. Accordingly, SQL test cases are devised which exercise the optimizer program's different binary joins strategies & costing algorithms The SQL test cases can be characterized as those exploiting inner joins and those exploiting outer joins. The joins can be further classified into primary index based joins and non-primary index based joins. The joins can again be further classified according to whether joins performed are on unique columns or joined on non-unique columns. To systematically study the impact of the new single-table access cost formulas on binary join plans, the tables used in the tests may, for example, be varied from one row to one billion rows so as to cover a large selection of the basic optimizer binary join scenarios. The number of queries provided in each test case depends on the desired granularity of validation. Utilising more queries in a test plan provides a more comprehensive and better characterization of the optimizer strategy.

The summary plans generated by the optimizer program for each test case are stored in a relational database. Specifically, the relational database stores all the demographics & specific characteristic information for each optimizer plan. For example, in an embodiment the geographies, cardinalities and/or join type may be stored in the relational database. This data is later used for comparison, characterization & report generation. In accordance with the embodiment described herein, a Teradata Relational Database QCD (Query Capture Database) tool available from NCR Corporation is utilized for capturing the summary plans. Queries are run with the software change and without the software change and their characteristics are stored in summary plans for comparison in subsequent steps of the method described herein.

Once the plan summary has been stored, a plan comparator is triggered which searches for differences between the comparative optimizer plans. The plan comparator captures the information regarding the "difference" and stores this information in association with the relevant queries in a "difference table". In accordance with the described embodiment, the information regarding the difference relates to the difference in geography and/or join types.

The following step involves submitting the queries from the "difference table" to a relational database management system and recording the output in a relational database. A tool which may be used to carry out this step is the Database Query Logging Tool available from NCR Corporation. In this embodiment, the output is measured in terms of execution time and CPU time. A relationship is established between the queries in the QCD and queries stored in DBQL. Finally, a report is generated for each test case, describing the total elapsed time, total CPU time, and difference in elapsed and CPU time between the releases. The time may be expressed either as an absolute value or percentage and/or cardinality estimate.

A sample output (omitting specific geography and characteristic information details) of results at test level is shown below in Table 1. From the output report, it can be seen that as a result of the new software release there is a regression in the BINARYJOINLEFT, BINARYJOINRIGRI and BINARYJOINDIR tests.

To more clearly analyze the impact of each SQL query, all the similar join strategies and geography changes are grouped together in a summary table, in association with the recorded gain or loss in performance. Any gain in performance can be considered as a positive impact of the software change, whereas any loss in performance can be considered as a regression.

A simple example summary table is shown in FIG. 5. From the illustrated summary table it can be seen that the software changes have had a negative impact as a result of favouring hashed/hashed product join over duped/local merge join, but a positive impact as a result of favouring duped/local hash join over hashed/hashed merge join.

In a further step, details of the summary table can be plotted on a graph to fiber aid in characterization and analysis of the software change. The basic SQL involved in a join can be considered as a join of two tables (for a simple binary join), that corresponds to a point on an x-y graph with x representing the number of rows for one of the tables and y representing the number of rows for the other table. There are two types of graphs which can be plotted. The first of those graphs represents the overall graphical plot for each & every SQL in a particular test case. In an embodiment, each join is plotted on the x-y axis as a point with a specific color and symbol denoting a particular optimizer join strategy and geography combination. This forms a binary join graph (although the graph could be plotted for any type of join strategy as determined by the test case) that can be visualized as a collection or collage of multi shaded areas, with each area representing a specific join geography and strategy. In effect, the graph acts as a trend graph, providing a visual characterization of the transition of join geographies and strategies with respect to the number of rows in each of the two tables (as represented on the x and y axis). Trend graphs are plotted both with and without the software release change.

An example of a pre and post variation binary join trend graphs depicting join strategy and geography with respect to various sizes of left tables and right tables are shown in FIGS. 6 & 7. In the graphs, the differently shaded regions denote the different join strategies and geographies. The size of the region signifies the coverage of one join-geography combination plan in the binary join plan map. For example, the dark square regions denoted by item 501 in FIG. 6 are used to

TABLE 1

Example Output Report

| Test name | Regression % | T1ElapseTime | T1CPUTime | T2ElapseTime | T2CpuTime |
|---|---|---|---|---|---|
| BINARYJOIN | −4.02% | 155.35 | 1333.16 | 149.11 | 1034.18 |
| BINARYJOINFULL | −2.31% | 61754.8 | 215797.14 | 60330.03 | 194314.77 |
| BINARYJOINLEFT | 11.21% | 5884.91 | 71799.76 | 6544.47 | 50578.36 |
| BINARYJOINRIGHT | 11.79% | 5887.94 | 71885.66 | 6581.85 | 50519.73 |
| BINARYJOINDIR | 23.89% | 75.64 | 785.83 | 93.71 | 628.1 |
| BINARYJOINEXCL | −7.69% | 3705.57 | 31484.37 | 3420.46 | 25429.47 |
| BINARYJOININCL | −4.20% | 5857.19 | 49531.18 | 5611.25 | 44278.43 |

While the above table provides a simple way to determine whether particular regression has occurred for a particular strategy, it is not suitable for clearly showing the impact of every SQL query. Analyzing the result of each & every SQL is very complex. As mentioned above, each optimizer plan has a number of different elements/specifications, such as the join strategy of the plan, the geography of the input relation and input rows. Accordingly, when the optimizer strategy changes, one of the elements will also change.

identify hashed/sorted merge joins. It will be appreciated by persons skilled in the art that any combination of colour and shape could be used to denote a particular join strategy or geography for the particular join.

Figure 8:
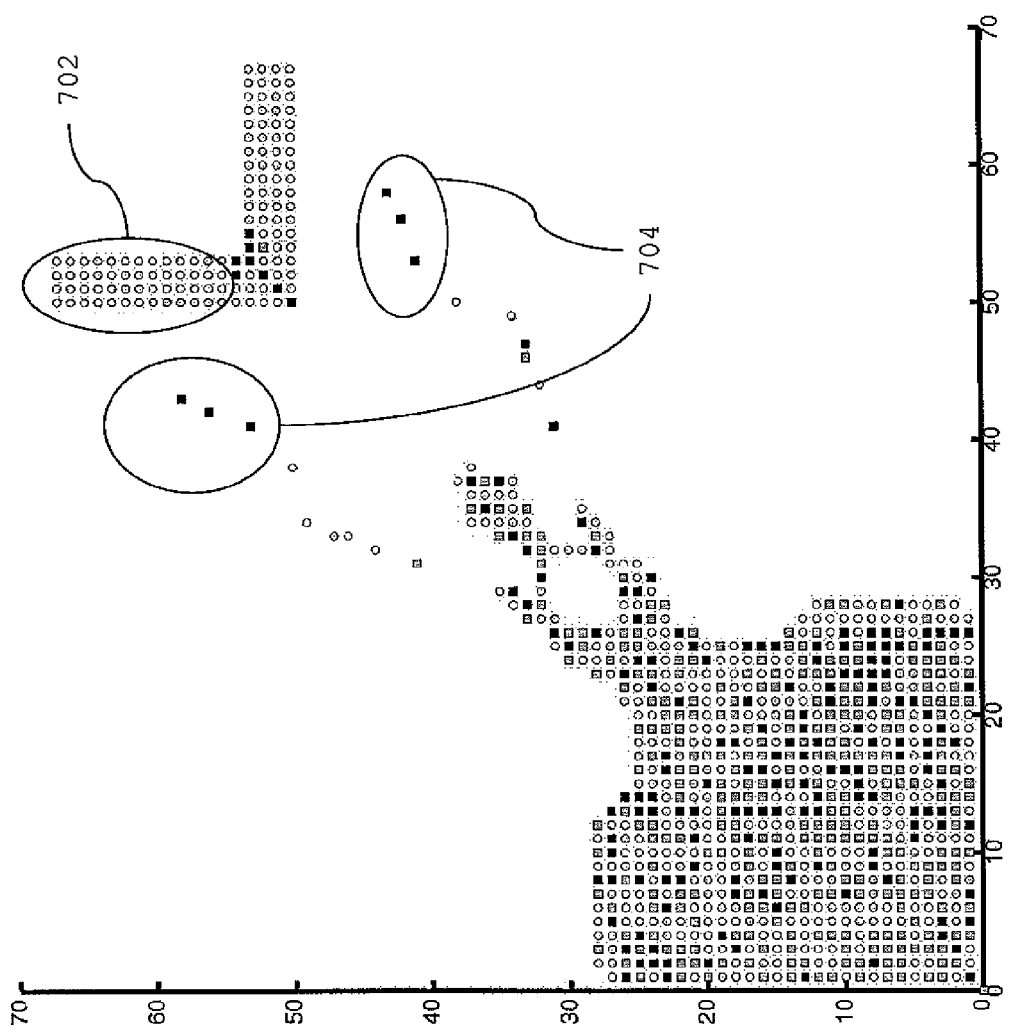
FIG. 8 is a regression graph output by the optimizer validation tool.

By impressing one plot (a pre-variation graph) over the other plot (a post-variation graph) a regression graph can be produced for providing a visualization of what, where and how much change has occurred for each query, as a result of the variation to the optimizer strategy. In other words, the regression graph depicts only those queries that differ between pre and post variation optimizer plans. This is best shown in FIG. 8, which is a "difference" or regression graph of FIGS. 6 & 7. Based on the execution results, all of the performance gains are plotted using one color, all of the losses are plotted using another colour, and areas where no discernable change has occurred are left blank. In the illustrated embodiment the regions depicted in a lighter shade (see for example, item 702) represent a gain in performance, while elements shaded in a darker shade (item 704) show areas of regression. As can clearly be seen from FIG. 8, the regression graph provides an easy way to determine the overall impact of the software change across a wide variety of differently sized tables.

Advantageously, embodiments of the present invention provide a systematic way to validate and characterize the impact of a software change to an optimizer program. For example, the methodology employed in aspects of the present invention may be used to characterize changes to query plans for particular optimizer strategies, thus allowing developers and users to address potential regression problems caused by the change before the software is released. Furthermore, the methodology may be applied to determine other aspects of optimizer join planning such as, for example, whether the second best costed plan is always better than the first best costed plan, etc. Such investigation can help to identify costing algorithms employed by the optimizer software that need enhancement. Also, in accordance with aspects of the invention, users may predict the join plan for a particular type of query based on the demographics of their data. In other words, even with no change to the optimizer program, the outputs of a test case can be used by users to characterize the kind of join plans generated by the optimizer based on for example, the demographics of the data. This effectively provides an indication of what kind of plan change to expect if the data demographics change.

It will be appreciated that the above described embodiments can be implemented by a system of computer hardware and software. While the invention has been described in reference to its preferred embodiments, it is to be understood that the words which have been used are words of description rather than limitation and that changes may be made to the invention without departing from its scope as defined by the appended claims.

The invention claimed is:

1. A method of determining the performance of an optimizer program arranged to generate a plan, the method comprising the steps of:
executing, by a processing node of a database system, an optimizer utilizing at least one test case to derive a pre-variation plan;
executing, by the processing node, the derived pre-variation plan to generate a first output;
varying, by the processing node, a strategy of the optimizer by changing at least one of a costing algorithm strategy utilized by the optimizer and a cardinality estimate mechanism of the optimizer;
executing, by the processing node, the varied strategy of the optimizer utilizing the at least one test case to derive a post-variation plan;
executing, by the processing node, the derived post-variation plan to generate a second output; and
grouping, by the processing node, the generated first and second outputs according to at least one element of the derived pre-variation and post-variation plans, wherein the performance of the optimizer is determined based on the grouping.

2. The method of determining the performance of the optimizer program in accordance with claim 1, wherein the at least one element comprise demographic or characteristic information.

3. The method of determining the performance of the optimizer program in accordance with claim 1, wherein the at least one test case comprises one or more queries for testing the strategy of the optimizer.

4. The method of determining the performance of the optimizer program in accordance with claim 1, wherein the first and second outputs are expressed as a function of execution time.

5. The method of determining the performance of the optimizer program in accordance with claim 1, wherein the first and second outputs are expressed as a function of time taken by the CPU to execute the plan.

6. The method of determining the performance of the optimizer program in accordance with claim 1, comprising the further step of executing only pre and post variation plans which have different join strategies or geographies.

7. The method of determining the performance of the optimizer program in accordance with claim 1, wherein the first and second outputs are expressed as a percentage.

8. The method of determining the performance of the optimizer program in accordance with claim 1, wherein the first and second outputs are expressed as an absolute value.

9. The method of determining the performance of the optimizer program in accordance with claim 1, wherein the step of varying the strategy of the optimizer comprises changing at least one costing algorithm strategy utilized by the optimizer.

10. The method of determining the performance of the optimizer program in accordance with claim 1, wherein the step of varying the strategy of the optimizer comprises making a cardinality estimate change to the optimizer.

11. The method of determining the performance of the optimizer program in accordance with claim 1, comprising the further step of plotting a plurality of individual joins generated by one of the pre-variation and post-variation plans as points on a graph, the visual appearance of each point providing a representation of at least one of a join strategy and geography used to perform the join.

12. The method of determining the performance of the optimizer program in accordance with claim 1, comprising the further step of comparing the results of pre and post variation plans by plotting as points on a graph only joins that have at least one of a different geography and join strategy when the pre and post variation plans are compared.

13. The method of determining the performance of the optimizer program in accordance with claim 12, comprising the further step of utilizing at least one of a symbol and color to represent the points on the graph, the at least one of a symbol and color representing a quantitative measure of the performance of the join.

14. A system for determining the performance of an optimizer arranged to generate a plan in a database system, the system comprising:
the optimizer, executed by a processing node, arranged to utilize at least one test case to derive a pre-variation plan;
a module, executed by the processing node, arranged to vary a strategy of the optimizer by changing at least one of a costing algorithm strategy utilized by the optimizer and a cardinality estimate mechanism of the optimizer;
the varied strategy of the optimizer being arranged to utilize the at least one test case to derive a post-variation plan;

a database system arranged to execute the derived pre-variation plan to generate a first output and the derived post-variation plan to generate a second output; and a module, executed by the processing node, arranged to group the generated first and second outputs according to at least one element of the derived pre-variation and post-variation plans and to generate a report displaying the at least one element in association with the grouping of first and second outputs, wherein the performance of the optimizer is determined based on the generated report.

15. The system in accordance with claim 14, wherein the at least one element comprise demographic or characteristic information.

16. The system in accordance with claim 14, wherein the at least one test case comprises one or more queries for testing the strategy of the optimizer.

17. The system in accordance with claim 14, wherein the first output and the second output are expressed as a function of execution time.

18. The system in accordance with claim 14, wherein the first output and the second output are expressed as a function of time taken by the CPU to execute the plan.

19. The system in accordance with claim 14, comprising the further step of executing only pre and post variation plans which have different join strategies or geographies.

20. The system in accordance with claim 14, wherein the first output and the second output are expressed as a percentage.

21. The system in accordance with claim 14, wherein the first output and the second output are expressed as an absolute value.

22. The system in accordance with claim 14, wherein the module varies the strategy of the optimizer by changing at least one costing algorithm strategy utilized by the optimizer program.

23. The system in accordance with claim 14, wherein the module varies the strategy of the optimizer by making a cardinality estimate change to the optimizer.

24. The system in accordance with claim 14, further comprising a plotting module arranged to plot a plurality of individual joins generated by one of the pre-variation and post-variation plans as points on a graph, the visual appearance of each point providing a representation of at least one of a join strategy and geography used to perform the join.

25. The system in accordance with claim 14, further comprising a plotting module arranged to compare the results of pre and post variation plans by plotting as points on a graph only joins that have at least one of a different geography and join strategy when the pre and post variation plans are compared.

26. The system in accordance with claim 25, wherein the plotting module utilizes at least one of a symbol and color to represent the points on the graph, the at least one of a symbol and color representing a quantitative measure of the performance of the join.

* * * * *